O. C. & O. J. BARNES,
Whiffletree.
No. 13,418.                                    Patented Aug. 14, 1855.
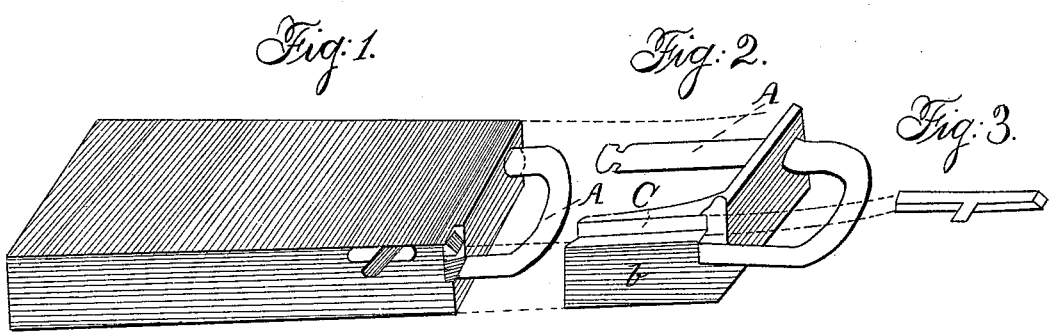

UNITED STATES PATENT OFFICE.

O. C. BARNES AND O. J. BARNES, OF STOCKBRIDGE, VERMONT.

WHIFFLETREE.

Specification of Letters Patent No. 13,418, dated August 14, 1855.

*To all whom it may concern:*

Be it known that we, O. C. BARNES and ORSANUS J. BARNES, of Stockbridge, in the county of Windsor and State of Vermont, have invented a new and Improved Mode of Constructing Whiffletrees; and we do hereby declare that the following is a full and exact description thereof, reference being had to the accompanying drawings.

Figure 1 represents the whiffletree with the irons put in readiness for work. Fig. 2 represents an angle shaped piece of iron through which the hook A passes, forming a bearing for the hook and having the groove *c* on its other angle, in which the slide catch represented at Fig. 3 may work. The arm of the angle represented at *b* Fig. 2 is to be driven into the end of the wood and being shaped like a wedge it serves to tighten the iron band and form the groove *c* a solid iron slot for the catch Fig. 3 to work in, the other arm of the angle passing across the end of the wood and fitting close in the iron band, thus forming a wedge to fasten the band a solid groove for the slide and a bearing for the hook substantially as described.

The nature of our invention consists of providing a whiffletree having a turning hook and slide catch with an angle shaped piece of iron to be driven into the end, forming a wedge to tighten the band and also to form a groove for the catch to slide in of solid iron in such a way that the hardest draft cannot injure its movement and passing across the end making it solid iron and forming a bearing in which the hook may turn substantially as described.

We do not claim the turning hook nor the sliding catch; but

What we do claim as our invention and desire to secure by Letters Patent is—

The application of the angle shaped iron forming the solid iron groove together with the wedge and bearing for the hook.

ORAMEL C. BARNES.
O. J. BARNES.

Witnesses:
ALBERT FOXE,
W. N. BLOSSOM.